United States Patent
Kubik

(10) Patent No.: US 6,693,418 B2
(45) Date of Patent: *Feb. 17, 2004

(54) MAGNETIC WHEEL SPEED SENSOR HAVING ONE-PIECE POLE AND MAGNETIC FLUX CONCENTRATOR

(75) Inventor: James M. Kubik, Avon Lake, OH (US)

(73) Assignee: Bendix Commercial Vehicle Systems LLC, Elyria, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/479,153

(22) Filed: Jan. 7, 2000

(65) Prior Publication Data

US 2002/0153878 A1 Oct. 24, 2002

(51) Int. Cl.[7] .............................. G01P 3/44; G01P 1/02
(52) U.S. Cl. ................................. 324/174; 324/207.15
(58) Field of Search ............................ 324/173, 174, 324/207.15, 207.16, 207.25, 260; 73/493, 494, 514.39, 661; 336/90, 92, 221

(56) References Cited

U.S. PATENT DOCUMENTS

| | | |
|---|---|---|
| 3,492,518 A | 1/1970 | Wayne |
| 3,719,841 A | 3/1973 | Ritsema |
| 3,793,545 A * | 2/1974 | Leiber et al. ................ 310/168 |
| 3,942,045 A | 3/1976 | Palazzetti |
| 4,011,478 A | 3/1977 | Reenstra |
| 4,196,390 A | 4/1980 | Pitkin |
| 4,268,771 A | 5/1981 | Lace |
| 4,626,781 A | 12/1986 | Forkel |
| 4,652,818 A | 3/1987 | Bushschmid et al. |
| 4,700,133 A | 10/1987 | Day |
| 4,804,911 A | 2/1989 | Saito et al. |
| 4,841,243 A * | 6/1989 | Bishop et al. ................ 324/173 |
| 4,937,522 A | 6/1990 | Gee |
| 5,032,790 A * | 7/1991 | Johnson ........................ 324/174 |
| 5,067,350 A | 11/1991 | Grillo et al. |
| 5,148,105 A | 9/1992 | Okada |
| 5,311,029 A | 5/1994 | Beatrice |
| 5,388,916 A | 2/1995 | Ohtsuki et al. |
| 5,486,758 A * | 1/1996 | Hammerle .................... 324/173 |
| 5,560,462 A | 10/1996 | Gustin |
| 5,563,510 A * | 10/1996 | Gorrell et al. ............... 174/52.3 |
| 5,563,511 A * | 10/1996 | Van Fleet, III .............. 324/174 |
| 5,633,062 A * | 5/1997 | Saito et al. ................... 324/174 |
| 5,670,873 A * | 9/1997 | Onishi et al. ................ 324/174 |
| 5,744,720 A | 4/1998 | Ouchi |
| 5,922,953 A | 7/1999 | Payne et al. |
| 5,987,986 A | 11/1999 | Wyse et al. |
| 5,998,988 A * | 12/1999 | Dickmeyer et al. .......... 324/174 |
| 6,075,359 A * | 6/2000 | Van Fleet, III .............. 324/174 |
| 6,253,614 B1 | 7/2001 | Steinauer et al. |
| 6,392,405 B1 | 5/2002 | Nishizaki et al. |
| 6,392,406 B1 | 5/2002 | Palfenier et al. |

FOREIGN PATENT DOCUMENTS

| | | |
|---|---|---|
| EP | 0 480 844 | 4/1992 |
| JP | 63-235811 | 9/1988 |
| JP | 6-342002 | 12/1994 |

* cited by examiner

*Primary Examiner*—Jay Patidar

(57) ABSTRACT

A wheel speed sensor assembly improves the performance and also simplifies manufacturing. It includes a one-piece pole and magnetic flux concentrator having first, second, and third regions of distinct diameters. Overmolded components at opposite ends of the pole/concentrator provide a cavity for the winding that eliminates the conventional use of a bobbin. A magnet is received over the pole between the first end and the intermediate region so that the magnet is more closely disposed adjacent the pole end of the sensor assembly. A molded end cap is provided at the opposite end of the assembly and one cap design can be easily substituted for another as desired.

10 Claims, 1 Drawing Sheet

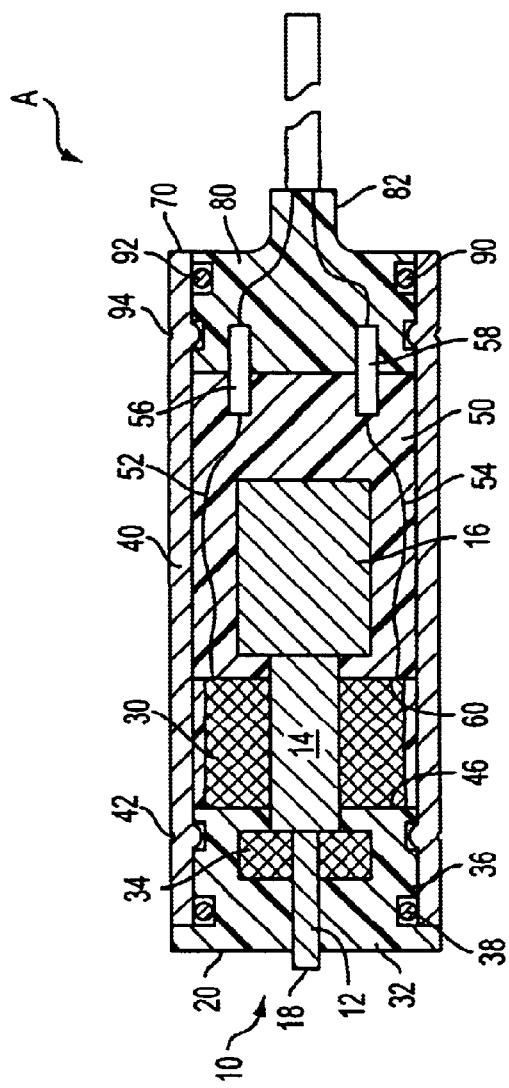
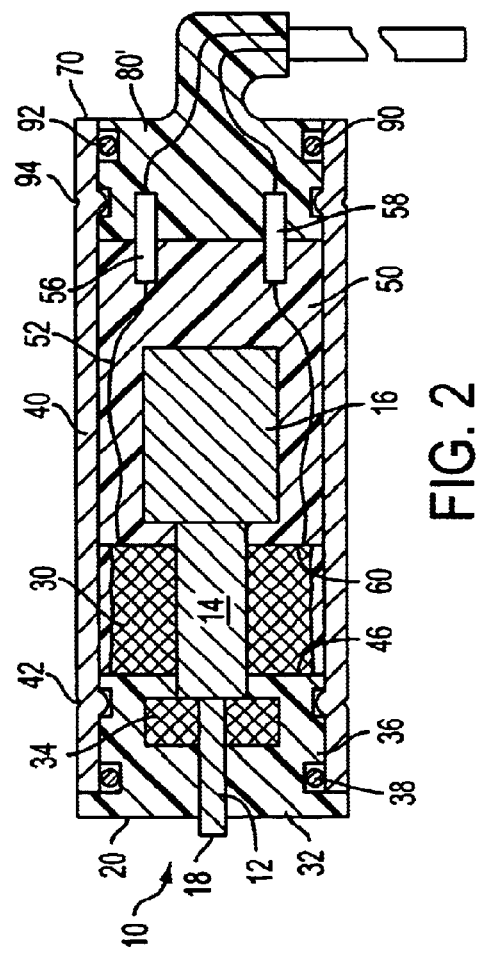

MAGNETIC WHEEL SPEED SENSOR HAVING ONE-PIECE POLE AND MAGNETIC FLUX CONCENTRATOR

BACKGROUND OF THE INVENTION

1. Field of the Invention

This application relates to a truck brake system, and more particularly to an apparatus and method of forming an inexpensive sensor for monitoring wheel speed rotation.

2. Discussion of the Art

Although a number of new technologies exist for detecting rotation to determine wheel speed, none are presently believed to be viable alternatives due to cost of application of the new technology. For example, consideration has been given to detecting rotation by using optics or infrared sensors. To date, these alternatives are deemed to be too expensive. Moreover, the use/operation of optical arrangements is sensitive to the external environment, i.e., mud, dirt, etc.

The established technology senses wheel speed based on variable reluctance. That is, a tone ring rotates with the wheel. Mounted adjacent to the tone ring is a pickup or sensor. The sensor includes a pole piece disposed closely adjacent to the tone ring so that it is sensitive to movement of the ring. The pole piece cooperates with a magnet to establish a magnetic field that is interrupted by rotation of the tone ring. The tone ring has teeth that interrupt the flux path and the this causes a signal in the sensor which is communicated to the winding which amplifies the signal. In addition, a flux concentrator, typically a mass or block of metal, is also used to improve the efficiency of the sensor.

A separately manufactured plastic bobbin is used in the wheel speed sensors in commercial use today. The winding is received around the bobbin and the winding is secured to an electrical connector extending outwardly from an end of the sensor remote from the tone ring. A number of different shaped connectors or tails are used. For example, a straight head, right-angle head, or a straight head with an integrated shoulder are three types of molded connector boots or shrouds requiring separate molds for each of the different shapes. This wide variety of configurations is less cost efficient than a standardized design. Accordingly, needs exist in improving existing technology, with desired improvements in both cost and efficiencies of performance.

SUMMARY OF THE INVENTION

The present invention provides a wheel speed sensor that is significantly reduced in cost and obtains improved signal efficiencies, while maintaining the flexibility of design.

An exemplary embodiment of the wheel speed sensor includes a one-piece pole and magnetic flux concentrator having molded regions over first and second ends with a winding received between the first and second molded materials. A magnet is received over the pole and preferably encased within the first material to establish a magnetic field. A sleeve is received over the assembly allowing the pole to extend outwardly from the first end of the sleeve and a connector assembly from the second end.

The one-piece pole and magnetic flux concentrator includes first, second, and third regions or sections having different cross-sectional dimensions. The first or smallest section serves as the pole piece of the sensor, the second section serves as an internal support for the winding, and the third section has the largest cross-sectional dimension and serves as the flux concentrator.

An exemplary method of assembling the wheel speed sensor includes the steps of providing a one-piece pole and magnetic flux concentrator, mounting a magnet over a first end, molding a first material over the magnet and first portion of the magnetic flux concentrator; molding a second material over a second portion of the pole and magnetic flux concentrator, winding a wire about the pole and magnetic flux concentrator between the first and second materials, and enclosing the assembly.

A sleeve is dimensioned for receipt over the first and second materials and is mechanically secured thereto.

Electrical connection is completed from the windings to a plastic overmolded electrical connector that is inserted in one end of the sleeve.

BRIEF DESCRIPTION OF THE DRAWINGS

The invention may take physical form in certain parts and arrangements of parts, the preferred embodiments of which are described in this specification and illustrated in the accompanying drawings.

FIG. 1 is a longitudinal cross-sectional view of the present invention having a first variation of an electrical connector.

FIG. 2 is a view of another preferred embodiment substantially identical to FIG. 1 and including a second variation of electrical connector.

DETAILED DESCRIPTION OF THE PREFERRED EMBODIMENTS

A new wheel speed sensor assembly A is shown in FIGS. 1 and 2. It includes a one-piece pole and magnetic flux concentrator 10 formed from metal and having three distinct regions or section 12, 14, 16. The first section 12 has the smallest diameter, for example, on the order 0.10 inches in diameter. This portion defines the pole of the one-piece pole/concentrator. As such, it includes an end 18 that extends outwardly from a first end 20 of the sensor assembly A. As one of ordinary skill in the art will appreciate, it is important that the dimension or distance between the pole and the wheel and tone ring 19 be maintained at a minimum. For example, a gap on the order of 0.010 inches is desirable to obtain maximum sensor performance. It is also preferable that the pole be exposed at the end of the sensor assembly, i.e., not encased or shrouded, so that sensitivity or gap tolerance of the sensor is not compromised.

The second portion 14 pole/concentrator is of an intermediate diameter. As will become more apparent below, it serves as an internal support for winding 30. For example, a large number of turns are used in the winding to amplify the signal. In a preferred arrangement, the winding is approximately 450 feet long by using numerous turns of 0.002 wire. It will be appreciated, however, that a different diameter wire, or greater or lesser number of turns, or length of wire can be used to achieve the desired results without departing from the scope and intent of the subject invention.

The third region 16 of the pole/concentrator preferably has the largest cross-sectional dimension. It serves as a large metal mass to concentrate the signal picked up or detected at the pole end and ultimately conveyed to an electronic control unit (not shown) of an anti-lock brake system or traction control system.

A first material or plastic overmold is formed over a substantial portion of the first region of the pole/concentrator, and partially over the second region 14. The mold material 32 also locates and confines in place a magnet 34. The magnet is preferably an annular configuration dimensioned for receipt over the first region 12 and abutting against the stepped interface between the first and second regions 12, 14 of the pole/concentrator. This arrangement advantageously locates the magnet close to the pole end which also improves the performance of the sensor.

The first material 32 forms an end cap and preferably includes an external groove 36 that receives a seal member, such as O-ring seal 38, therein. The O-ring is circumferentially continuous and provides a suitable barrier to the internal components of the sensor assembly from the external environment. The outer dimension or diameter of the first material is preselected to conform to an inner diameter of a stainless steel, seamless tubing or sleeve 40. Thus, the O-ring provides a seal interface between the first material and the sleeve 40 at a first end of the sensor assembly. When axially inserted into the sleeve 40, the end 20 of the first material is aligned with the end of the sleeve 40, and then a mechanical connection, such as circumferentially spaced crimps 42, is provided in the sleeve to mechanically interlock the individual components of the wheel speed sensor together.

A second end 46 of the first material defines a radial wall or abutment for the winding 30. Similarly, a second material 50 is received over the third region 16 of the pole/concentrator. This is preferably a plastic overmolded material that has an outer diameter substantially identical to the inner diameter of the sleeve 40. Opposite ends of the winding include leads 52, 54 that extend through the second material for connection with conductor pins 56, 58, respectively at one end of the second material. The connector pins may be integrally molded in the second material or recesses provided therein to receive the connector pins. Thus, a first end 60 of the second material forms an abutment for the winding 30. It cooperates with the end face 46 of the first material, the inner diameter of the sleeve, and the outer diameter of the second region 14, to define a cavity that serves as a bobbin for the winding.

It will be further appreciated that the axial length of the sleeve 40 and that of the second material are selected so that the conductor pins 56, 58 are disposed inwardly from a second end 70 of the sensor assembly. A third material or end cap 80 is axially dimensioned to fill the remainder of the cavity defined by the sleeve. It is preferably a plastic overmolded component that receives the conductor pins along an interior face and includes a necked or reduced dimensioned region 82 that extends outwardly from the end of the assembly to serve as a wiring harness leading to the electronic control unit. In the embodiment of FIG. 1, the configuration of the extension is a straight extension, while in FIG. 2, a 90° or right-angled shoulder is illustrated. Of course, other configurations can be used as desired.

The third material also includes an external groove 90 that receives a seal member, such as O-ring seal 92, therein. The seal member provides a sealed interface between the inner diameter of the sleeve and the outer diameter of the third material adjacent the second end 70 of the sensor assembly. In addition, the third material is axially locked or mechanically connected to the sleeve via a series of circumferentially spaced crimps 94, whereby the tubing is radially deformed to grip the third material. This provides a simplified mechanical connection that does not breach the integrity of the seamless tubing used to form the sleeve. Consequently, the internal components of the sensor assembly are adequately sealed from the external environment.

A comparison of FIGS. 1 and 2 illustrates that all of the components of the sensor assemblies are identical except for the third material or end cap 80. Still other configurations of the end caps can be used if necessary. On the other hand, a much more simplified construction and method of assembly is achieved with the design while using conventional, proven wheel speed sensor technology.

Assembly of the components preferably proceeds as follows. The one-piece pole/magnetic flux concentrator receives a magnet over the first region 12. Preferably, it abuts against the stepped interface with the second region 14. The first end cap 32 is then integrally molded over the first region of the pole/concentrator and a portion of the second region, as well as the permanent magnet. A second material 50 is molded over the concentrator region 16 and, in part, over the end of the second region 14. The winding 30 is wound in the cavity to the desired number of turns and the leads 52, 54 provided through the second material and welded to connector pins 56, 58. O-ring 38 is then positioned in place in its associated groove 36 and this subassembly, or cartridge, inserted into the sleeve 40. The desired embodiment of the second end cap is selected for receipt in the end of the sleeve, the O-ring 92 is positioned in the respective groove 90, the connector pins attached in place, and the entire assembly crimped as represented by reference numerals 42, 94.

This simplified socket and tube assembly provides a sensor that carefully controls the distance between the pole and the tone ring. It allows the end 18 of the pole to extend outwardly from the housing to limit the gap with the tone ring and improve performance. It is also unnecessary to provide an extension of the housing over the end 20 since the structure is still relatively robust. This can be achieved without any loss in environmental protection due to the O-ring seals provided at the opposite ends. The magnet is also disposed closer to the pole end, again improving the performance of the sensor assembly. A mechanical bond is effectively achieved between the individual components without perforating the sleeve—again addressing sealing of the assembly relative to the external environment. The mass of metal defined by the third region 16 also serves to focus the signal and improve performance. Therefore, overall, improved performance is achieved because of the close tolerances while still accommodating different end cap designs as desired.

The invention has been described with reference to the preferred embodiments. Modifications or alterations will occur to others upon a reading and understanding of this specification. The invention is intended to include such modifications and alterations insofar as they fall within the scope of the appended claims or the equivalents thereof.

Having thus described the invention, it is now claimed:

1. A wheel speed sensor for sensing rotation of a wheel having a tone ring associated therewith comprising:

a one-piece pole and magnetic flux concentrator having a first end proximate to said tone ring and a second end remote from said tone ring, said first and second ends interconnected by an intermediate region;

a first material molded over the first end of the pole and concentrator, and a second material molded over the second end of the pole and concentrator;

a winding received over the intermediate region between the first and second materials; and a magnet received over the pole, the entire magnet being located between the first end and the winding and encased within the first material.

2. The sensor of claim 1 further comprising a hollow sleeve received over the first and second materials.

3. The sensor of claim 2 wherein the sleeve is open ended at both first and second ends whereby the pole extends outwardly from the first end of the sleeve and receives a connector assembly in the second end.

4. The sensor of claim 2 wherein the sleeve is mechanically bonded to the first and second materials.

5. The sensor of claim 4 wherein the sleeve is mechanically crimped to the first and second materials.

6. The sensor of claim 2 further comprising a seal member interposed between the sleeve and the first material.

7. The sensor of claim 6 further comprising a second seal member interposed between the sleeve and the second material.

8. The sensor of claim 1 wherein the one-piece pole and magnetic flux concentrator includes first, second and third sections.

9. The sensor of claim 8 wherein the first, second, and third sections are of different cross-sectional dimension.

10. The sensor of claim 9 wherein the first section has the smallest cross-sectional dimension and is disposed at the first end to serve as the pole piece of the sensor, the second section has an intermediate cross-sectional dimension and serves as an internal support for the winding; and the third section has the largest cross-sectional dimension and serves as the flux concentrator.

* * * * *